United States Patent [19]

Allen

[11] Patent Number: 5,366,049
[45] Date of Patent: Nov. 22, 1994

[54] DRUM BRAKE SHOE HOLD-DOWN BRACKET AND CABLE GUIDE

[75] Inventor: Mark E. Allen, Mishawaka, Ind.

[73] Assignee: AlliedSignal Inc., Morristown, N.J.

[21] Appl. No.: 163,020

[22] Filed: Dec. 7, 1993

[51] Int. Cl.5 .............................. F16D 51/00
[52] U.S. Cl. ................... 188/340; 188/106 A
[58] Field of Search ............. 188/340, 335, 20, 106 A, 188/106 R

[56] References Cited

U.S. PATENT DOCUMENTS

| | | | |
|---|---|---|---|
| 2,294,329 | 8/1942 | Ayers et al. | 188/340 |
| 5,159,998 | 11/1992 | Copp et al. | 188/340 |

*Primary Examiner*—Matthew C. Graham
*Attorney, Agent, or Firm*—Larry J. Palguta; Leo H. McCormick, Jr.

[57] ABSTRACT

A drum brake (10) includes a backing plate (11) supporting a pair of drum brake shoes (12, 14) having brake shoe webs (16, 18). An opposing pair of brake shoe ends (26, 28) have adjacent thereto a combination drum brake shoe hold-down bracket and cable guide (60) attached to the backing plate (11). The hold-down bracket and cable guide (60) has a pair of securement portions (61) extending laterally or transversely, via axial projections (62) and ends (64), relative to the center of revolution (A) of the drum brake (10) and which engage the drum brake shoe webs (16, 18) to assist in maintaining the brake shoes (12, 14) in operative position. Each portion (61) of the hold-down bracket and cable guide (60) extends laterally toward one another via an axially extending portion (65) that curves in an annular path to form a center portion (67) that defines a cable guide path (68). A parking brake cable assembly (40) is captured within the cable guide path (68) so that it will not interfere with other brake components. The brake shoe hold-down bracket and cable guide (60) provides a positive method for preventing the brake shoes (12, 14) from lifting off the backing plate (11) and guiding the parking brake cable assembly (40).

4 Claims, 2 Drawing Sheets

DRUM BRAKE SHOE HOLD-DOWN BRACKET AND CABLE GUIDE

The present invention relates generally to a drum brake, and in particular to a drum brake having a combination drum brake shoe hold-down bracket and cable guide.

BACKGROUND OF THE INVENTION

Most drum brakes include a parking brake lever for parking brake actuation of the drum brake shoes. The parking brake lever is connected with a cable received slidably within a parking brake cable assembly that extends through an opening in the backing plate of the drum brake. It is highly desirable that the parking brake assembly does not interfere with other drum brake components such as an adjuster mechanism, a spring extending between opposing ends of the drum brake shoes, and the brake shoes themselves. It is also necessary for the drum brake shoes to be held in operative position so that they will not lift off, i.e. move axially away from, the backing plate which supports them. It is highly desirable that the axial retention of the drum brake shoes be combined with a mechanism which prevents the parking brake cable assembly from interfering with other brake components.

SUMMARY OF THE INVENTION

The present invention provides solutions no the above by providing a drum brake having a combination brake shoe hold-down bracket and cable guide, comprising a backing plate supporting thereon a pair of drum brake shoes, each of said drum brake shoes including a brake shoe web, actuation means for causing a first pair of brake shoe ends to move away from one another and into engagement with an adjacent rotatable drum, resilient means extending between the first pair of brake shoe ends and second resilient means extending between an opposite and second pair of brake shoe ends, a parking brake lever cooperating with means for effecting a parking application of said drum brake shoes, a combination hold-down bracket and cable guide connected with said backing plate and adjacent the second pair of brake shoe ends, and parking brake cable means extending into said drum brake and connected with an end of said parking brake lever, the combination hold-down bracket and cable guide comprising a metal member securely attached to said backing plate and having laterally extending projections which extend axially away from said backing plate and then transversely to a center of rotation of the drum brake such that respective bracket ends extend over respective brake shoe webs and assist in retaining brake shoes axially in operative position, a center portion of the bracket extending axially away from said backing plate and then extending in a annular path toward said backing plate to terminate in an end located adjacent the backing plate in order to provide an enclosed cable guide path, the cable means disposed in said cable guide path so that its position is maintained and interference prevented with other brake components.

Brief Description of the Drawings

One way of carrying out the invention is described in detail below with reference to the drawings which illustrate a specific embodiment in which.

Description of the Preferred Embodiment

Figure 1:
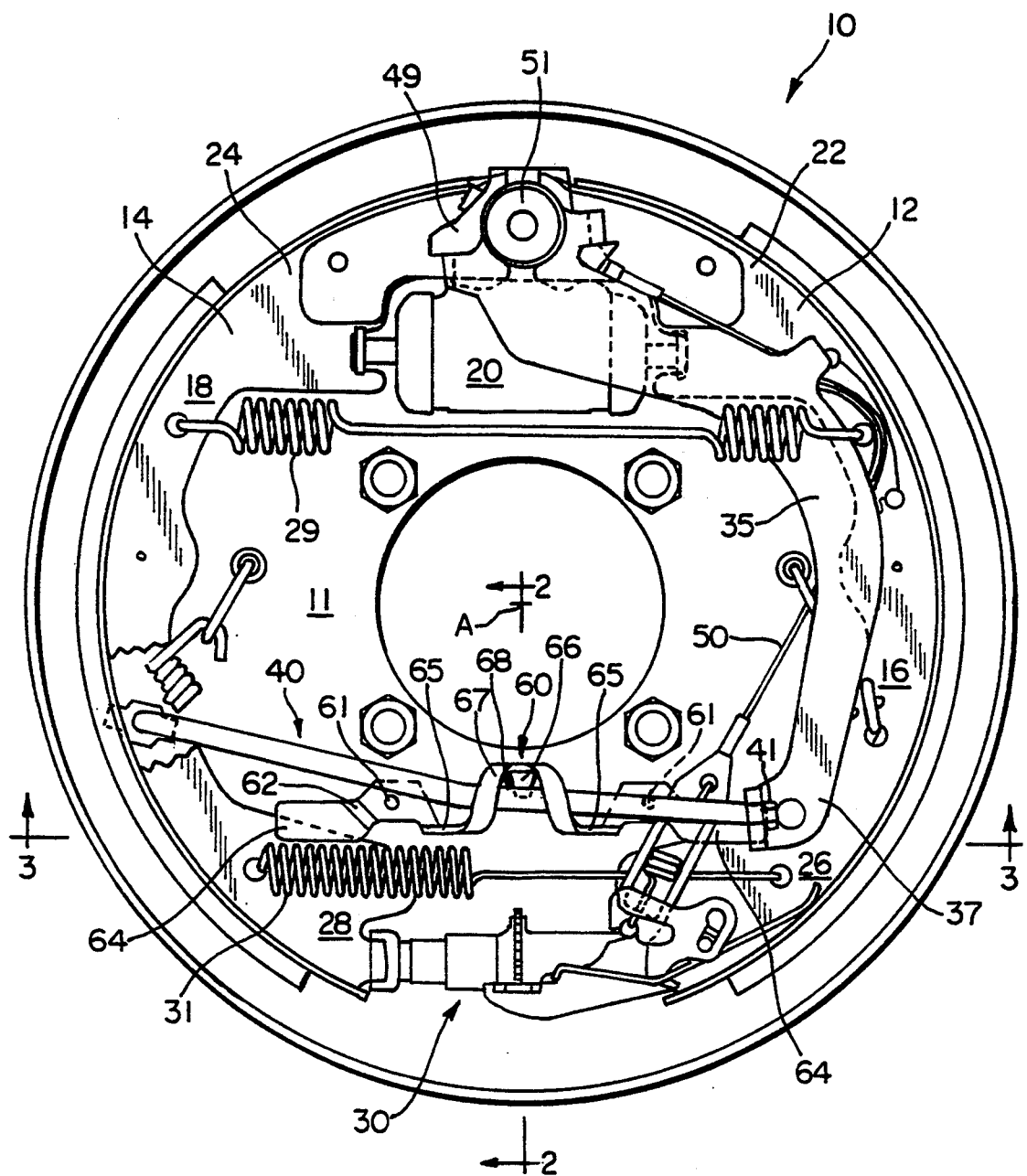
FIG. 1 is a drum brake which includes the present invention.
Figure 2:
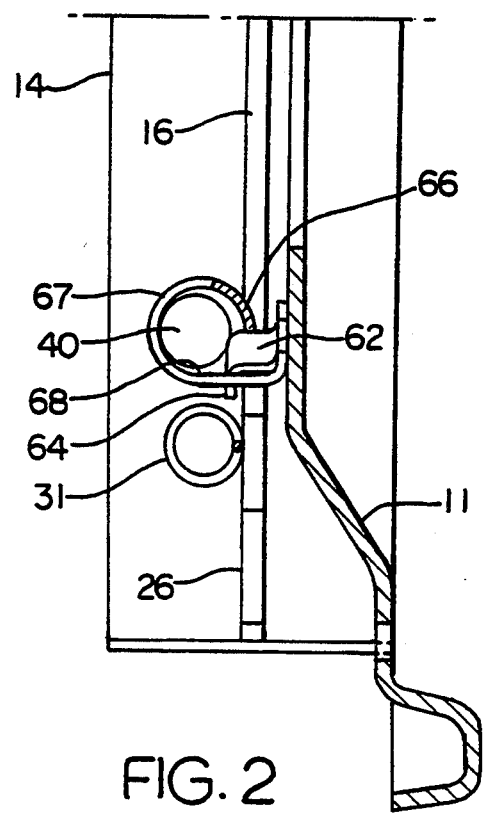
FIG. 2 is a section view taken along view line 2—2 of FIG. 1.
Figure 3:
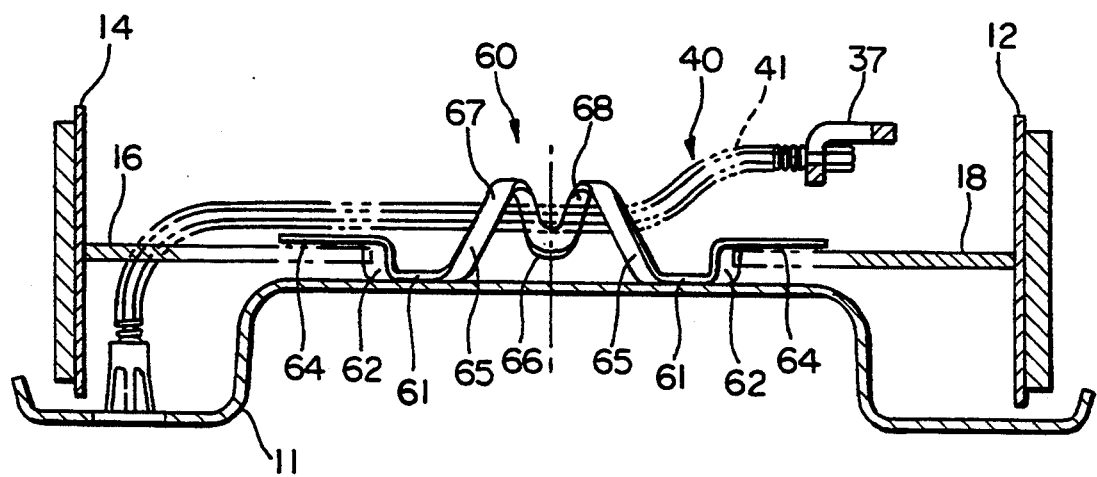
FIG. 3 is a section view taken along view line 3—3 of FIG. 1.

Drum brake 10 is designated generally by reference numeral 10 in FIG. 1. Drum brake 10 includes drum brake shoes 12 and 14 which include, respectively, drum brake shoe webs 16 and 18. Hydraulic actuator or wheel cylinder 20 is located between a first pair brake shoe ends 22 and 24 and an adjuster mechanism indicated generally by reference numeral 30 is located between a second pair of brake shoe ends 26, 28. Return spring 29 extends between brake shoe ends 22 and 24, while return spring 31 extends between brake shoe ends 26 and 28. A parking brake lever 35 is pivoted on pivot pin 51 and engages cam 49 which displaces brake shoes 12 and 14 for a parking brake application, and has end 37 receiving cable end 41 of a parking brake cable assembly designated generally by reference numeral 40. Cable 50 is attached at one end to pivot pin 51 and at the other end to adjuster mechanism 30 to effect actuation thereof.

The combination brake shoe hold-down bracket and cable guide is designated generally by reference numeral 60 and comprises a pair of securement portions 61 which are welded or riveted to backing or support plate 11. Each portion 61 extends axially away from backing plate 11 via an axially bent or axial projection 62 which, via a lateral retention portion or bracket end 64, spreads laterally or transversely relative to the center of rotation A of drum brake 10. Lateral retention portions 64 comprise wing members which engage drum brake shoe webs 16 and 18 to hold axially in place drum brake shoes 12 and 14. The drum brake shoes are free to move circumferentially outwardly or laterally relative to one another during operation of the drum brake. Each portion 61 also extends toward the other via an axially extending portion 65 which extends axially away from backing plate 11 and then curves in an annular path to terminate at cable guide end 66, with portions 65 and guide end 66 forming a substantially circular or annular center portion 67 that defines cable guide path 68 which receives parking brake cable assembly 40. Parking brake cable assembly 40 is captured within cable guide path 68 of the combination hold-down bracket and cable guide 60.

During operation of drum brake 10, drum brake shoes 12 and 14 may move away from one another or circumferentially outwardly such that the respective webs 16 and 18 slidably engage lateral retention portions 64 which permit such movement while retaining the drum brake shoes axially in operative position. The combination brake shoe hold-down bracket and cable guide 60 effects positioning of the parking brake cable assembly 40 so that it will not interfere with other brake components.

Brake shoe hold-down bracket and cable guide 60 is a one-piece metal stamping which provides a positive retention of both drum brake shoes so that they will not lift off or move axially away from backing plate 11, while also providing guidance and retention of parking brake cable assembly 40. The combination bracket and cable guide is manufactured from a lighter weight, easier to form into shape metal which, when manufactured, produces zero scrap. The combination bracket and cable guide will hold both brake shoes in place throughout their service life.

I claim:

1. A drum brake having a combination brake shoe hold-down bracket and cable guide, comprising a backing plate supporting thereon a pair of drum brake shoes, each of said drum brake shoes including a brake shoe web, actuation means for causing a first pair of brake shoe ends to move away from one another and into engagement with an adjacent rotatable drum, resilient means extending between the first pair of brake shoe ends and second resilient means extending between an opposite and second pair of brake shoe ends, a parking brake lever cooperating with means for effecting a parking application of said drum brake shoes, a combination hold-down bracket and cable guide connected with said backing plate and adjacent the second pair of brake shoe ends, and parking brake cable means extending into said drum brake and connected with an end of said parking brake lever, the combination hold-down bracket and cable guide comprising a metal member securely attached to said backing plate and having laterally extending projections which extend axially away from said backing plate and then transversely to a center of rotation of the drum brake such that respective bracket ends extend over respective brake shoe webs and assist in retaining the brake shoes axially in operative position, a center portion of the bracket extending axially away from said backing plate and then extending in a annular path toward said backing plate to terminate in an end located adjacent the backing plate in order to provide an enclosed cable guide path, the cable means disposed in said cable guide path so that the position of the cable means is maintained and interference prevented with other brake components.

2. The drum brake in accordance with claim 1, wherein the combination drum brake shoe hold-down bracket and cable guide is a one piece stamping which is one of welded and riveted to said backing plate.

3. The drum brake in accordance with claim 2, wherein the bracket and cable guide is welded to the support backing plate at two portions of the bracket, and each portion extends laterally toward one another to form the center portion extending axially away from the backing plate.

4. The drum brake in accordance with claim 3, wherein the end of the center portion is located above a part of the center portion which extends axially away from the backing plate.

* * * * *